US008742912B2

(12) United States Patent
Blanchard (10) Patent No.: US 8,742,912 B2
(45) Date of Patent: Jun. 3, 2014

(54) SELF-POWERED SENSOR SYSTEM FOR MONITORING TIRE PRESSURE

(75) Inventor: Richard Austin Blanchard, Los Altos, CA (US)

(73) Assignee: STMicroelectronics, Inc., Coppell, TX (US)

( * ) Notice: Subject to any disclaimer, the term of this patent is extended or adjusted under 35 U.S.C. 154(b) by 437 days.

(21) Appl. No.: 12/647,305

(22) Filed: Dec. 24, 2009

(65) Prior Publication Data

US 2010/0164705 A1 Jul. 1, 2010

Related U.S. Application Data

(60) Provisional application No. 61/142,119, filed on Dec. 31, 2008.

(51) Int. Cl.
*B60C 23/00* (2006.01)

(52) U.S. Cl.
USPC .......... 340/442; 340/445; 340/447; 73/146.2; 73/146.4

(58) Field of Classification Search
USPC ........... 340/442–448, 10.1, 10.3, 10.4, 10.41; 73/146.2–146.5
See application file for complete search history.

(56) References Cited

U.S. PATENT DOCUMENTS

| | | | | |
|---|---|---|---|---|
| 4,966,034 A | * | 10/1990 | Bock et al. | 73/146.5 |
| 5,228,337 A | * | 7/1993 | Sharpe et al. | 73/146.5 |
| 5,559,484 A | * | 9/1996 | Nowicki et al. | 340/447 |
| 5,708,411 A | * | 1/1998 | Hill | 340/447 |
| 5,825,286 A | * | 10/1998 | Coulthard | 340/447 |
| 6,060,984 A | * | 5/2000 | Braun et al. | 340/442 |
| 6,448,891 B2 | * | 9/2002 | Barnett | 340/438 |
| 6,545,599 B2 | * | 4/2003 | Derbyshire et al. | 340/442 |
| 6,725,713 B2 | * | 4/2004 | Adamson et al. | 73/146.5 |
| 6,807,853 B2 | * | 10/2004 | Adamson et al. | 73/146 |
| 6,966,221 B2 | * | 11/2005 | Wilson et al. | 73/146.5 |
| 7,138,911 B2 | * | 11/2006 | Tyndall | 340/447 |
| 7,322,236 B2 | * | 1/2008 | Combi et al. | 73/488 |
| 7,343,805 B2 | | 3/2008 | Combi et al. | |
| 2002/0095980 A1 | * | 7/2002 | Breed et al. | 73/146 |

(Continued)

OTHER PUBLICATIONS

"IC Sensors Products Databook: Pressure Sensors, Accelerometers, and Custom Microstructures", 2003, Measurement Specialties, p. 1-9 to 1-11.*

(Continued)

*Primary Examiner* — Mohammad Ghayour
*Assistant Examiner* — Nay Tun
(74) *Attorney, Agent, or Firm* — Seed IP Law Group PLLC (57) ABSTRACT

A self-powered tire pressure sensor device. The sensor device includes a power circuit, an air pressure measurement sensor, a signal circuit and a wireless transmission circuit. The power circuit converts mechanical acceleration experienced by the device into electrical potential using an electromechanical transducer. Mechanical acceleration due to collisions between the mobile sensor device and the wall of the tire while the tire is in motion cause the transducer to emit a small electrical charge. An electrical potential storage element in the power circuit accumulates and stores the charge as electrical potential. Alternatively the power circuit receives and converts electromagnetic energy into electrical potential. The electrical potential powers an air pressure measurement sensor within the tire. A signal circuit and wireless transmission circuit transmit the measurement to a chassis-mounted receiver, which makes the tire pressure measurement available to systems remote from the tire.

14 Claims, 7 Drawing Sheets

(56) References Cited

U.S. PATENT DOCUMENTS

| | | | |
|---|---|---|---|
| 2004/0061601 A1* | 4/2004 | Freakes et al. | 340/442 |
| 2006/0105857 A1* | 5/2006 | Stark | 473/353 |
| 2007/0159315 A1* | 7/2007 | Murata et al. | 340/447 |
| 2008/0074083 A1* | 3/2008 | Yarger et al. | 320/137 |
| 2008/0141766 A1* | 6/2008 | Roth et al. | 73/146.5 |
| 2008/0255805 A1* | 10/2008 | Ichikawa et al. | 702/183 |

OTHER PUBLICATIONS

Carey, D., "Safe bet: tire pressure sensors," EETimes Online, http://www.eetimes.com/news/design/showArticle.jhtml?articleID=208800620, Jun. 26, 2008, 2 pages.

Chait, A., "Solving "The Last Milli-Mile" Problem in Vehicle Safety; The EoPlex Approach to Powering Wireless Tire Pressure Sensors,"EoPlex Technologies, Inc., 8 pages, Jul. 8, 2008.

Razavi, B., "Gadgets Gab at 60 GHz: Cheap silicon transceivers broadcasting in this still-unlicensed band may usher in the hi-def wireless home," IEEE Spectrum, Feb. 2008, 6 pages.

"Reinventing the Wheel," p. 15, IEEE Spectrum, Feb. 2008.

Singh, et al., "Piezoelectric Power Scavenging of Mechanical Vibration Energy," Australian Mining Technology Conference, Oct. 2-4, 2007, p. 111-118.

"Tire pressure monitoring system," Wikipedia article, http://en.wikipedia.org/wiki/Tire_pressure_monitoring_system, downloaded Jun. 22, 2008.

Hand, Jennifer, "Modeling Optimizes a Piezoelectric Energy Harvester Used in Car Tires," in *COMSOL Multiphysics, MEMS Energy Harvesters Special Advertising Section,* Jun. 12-15, 2012 Online: www.comsol/.com/mechanical.

\* cited by examiner

SELF-POWERED SENSOR SYSTEM FOR MONITORING TIRE PRESSURE

BACKGROUND

1. Technical Field

This description generally relates to the field of automotive tire pressure sensors, and more particularly to sensors that provide the tire pressure while the automobile is being driven.

2. Description of the Related Art

The accurate measure of vehicle tire pressure while a vehicle is moving can prevent accidents and increase gas mileage. Government and university studies have cited the connection between tire under-inflation and vehicle crashes, including fatality rates.

On-board, in-motion systems for monitoring tire pressure exist, but typically these systems suffer from problems such as limited battery life, large size, and high cost. In systems that use a wired connection to power a tire-mounted sensor, there is the difficult problem of making a reliable continuous-path connection between the tire-mounted sensor and the chassis-mounted portion of the system. Monitoring the pressure sensor in such a system may also be a problem for the same reason.

One reference, "Solving the Last Milli-Mile Problem in Vehicle Safety; The EoPlex Approach to Powering Wireless Tire Pressure Sensors," by Arthur L. Chait, discloses a potential alternative. The paper discusses a tire-mounted pressure sensor that transmits data from a rotating tire using a wireless signal. In one embodiment, the sensor and the transmitter are powered by a battery. In two alternative embodiments from this paper, the sensor is powered from within the tire by one of two kinds of energy harvester, the first one a generator within the tire wall that extracts energy from the rotation of the tire itself and the other a piezoelectric generator that extracts energy from tire vibration.

Generally speaking, tire pressure sensors can make a "direct" or "indirect" measurement. Pressure monitoring systems in the direct-type category employ physical pressure sensors inside each tire and a means of processing and sending that information from inside the tire to a remotely located vehicle instrument cluster. The sensors are mounted on either the end of valve stems or by a steel band around a rim's drop well center. The sensors are typically quite large and are subject to damage during tire removal and fitting procedures. Banded sensors may also damage the tire bead's air seal.

Tire pressure monitoring systems in the indirect category measure the "apparent" air pressure by monitoring individual wheel rotational speeds or other signals available from outside the tire itself. Indirect monitoring systems use the fact that an underinflated tire has a slightly smaller diameter than a correctly inflated tire and therefore rotates at a higher angular velocity to cover the same distance as a correctly inflated tire. Indirect pressure monitoring systems are generally cheaper and easier than direct measuring systems because most modern vehicles already have wheel speed sensors for antilock breaking systems and electronic stability control systems. A disadvantage of these systems is that they are not as accurate and require frequent recalibration. Of course, as the tire wears out, or if new tires of a different size are purchased, the system either needs to be recalibrated or is no longer sufficiently accurate to be useable.

An online *EE Times* article from Jun. 26, 2008, by David Carey discloses a direct measurement pressure monitoring system that provides a pressure reading over a wireless link powered by a battery. The wireless link operates in the 315 MHz band and power is provided by an internal coin cell battery with up to 10 years of life. The pressure reading is made by a single packaged two-chip component from Senso-Nor. The etched silicon MEMS transducer uses a silicon "drum head" strain gauge to sense pressure through an open port on the package top side. An Infineon brand transmitter chip modulates outputs from the sensor with either amplitude shift or frequency shift keying. A wire wound antenna hangs directly from the transmitter chip and a 9.8 MHz crystal supplies timing for the sensor/transmitter pair.

The February 2008 issue of *IEEE Spectrum* discloses a tire pressure monitor for the prevention of car rollovers. The pressure sensor is powered by an inexpensive coin-sized device called a PZT bimorph that harvests energy from the tire's motion via a miniature piezoelectric springboard. The power source can be used in a pressure sensor located internal to an automobile tire.

BRIEF SUMMARY

A tire pressure sensor device measures the air pressure in an inflatable automobile tire according to one embodiment. The air pressure sensor device is located entirely within an inflatable portion of the tire. The sensor device is very small compared to the interior of the tire and is not attached to the tire wall or to the wheel, therefore the sensor freely moves about the inside of the tire when the tire is in motion.

The sensor device includes a power circuit, an air pressure measurement sensor, a signal circuit and a wireless transmission circuit. The power circuit converts mechanical acceleration experienced by the device into electrical potential using an electromechanical transducer. The electromechanical transducer experiences mechanical acceleration due to collisions between the mobile sensor device and the wall of the tire while the tire is in motion. The collisions cause the transducer to emit a small electrical charge, which an electrical potential storage element in the power circuit accumulates and stores as electrical potential.

The electrical potential storage element provides the potential to the air pressure measurement sensor to power the measurement sensor. The signal circuit receives a signal from the air pressure measurement sensor corresponding to the air pressure in the tire. The wireless transmission circuit transmits a signal corresponding to this pressure measurement to a chassis-mounted receiver, which makes the measured air pressure value available to systems remote from the tire.

In an alternative embodiment, the power circuit includes no electromagnetic transducer. In its place, the wireless transmission circuit includes a wireless receiver circuit and the power circuit includes a circuit to convert electromagnetic (EM) energy received by the wireless receiver into electrical potential. In this embodiment, an EM transmitter on the vehicle chassis transmits EM energy to the wireless receiver on the device. The power circuit converts the EM energy to an electrical potential, which is available to power the pressure measurement sensor.

DETAILED DESCRIPTION

Figure 1:
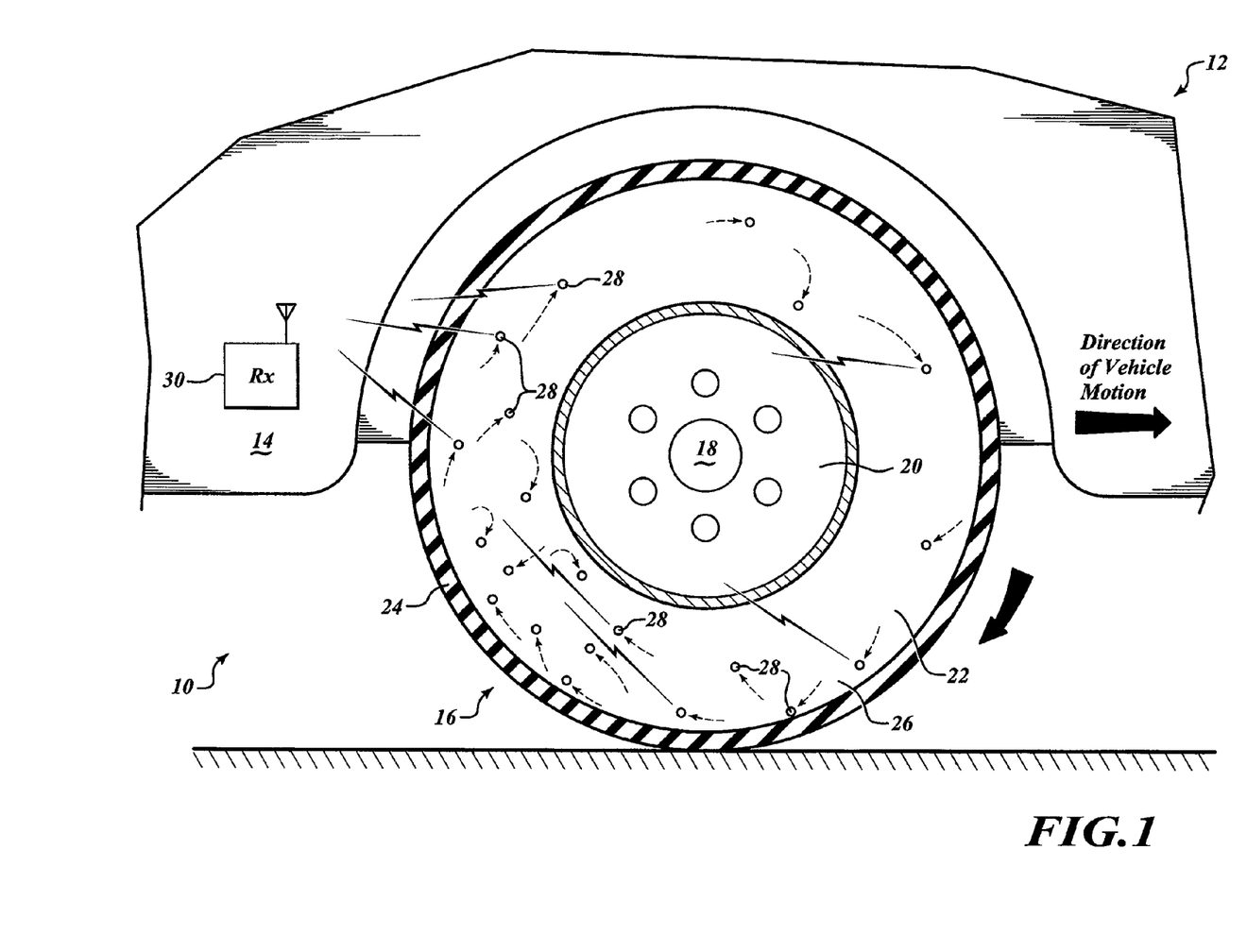
FIG. 1 illustrates a side view, including a partial cut-away view, of an automobile having a self-powered tire pressure sensor system.

FIG. 1 shows a self-powered tire pressure sensor system 10 installed on a vehicle 12. The vehicle 12 includes a chassis 14, a wheel 16, and a hub 18. The wheel 16 is mounted to the hub 18 by structures well known in the art. The hub 18 is connected to the chassis 14 by structures well known in the art, to couple the wheel 16 to the chassis 14. The wheel 16 includes a rim 20 and a tire 22 thereon. The tire 22 includes a body portion 24 having a tread area and walls, and an inflatable interior portion 26. The inflatable portion 26 is defined by the tread area and walls of the body portion 24 and the rim 20 to which the tire 22 is mounted. FIG. 1 shows in a partial cut-away view the relation between the body portion 24 and the inflatable portion 26.

Within the inflatable portion 26 of the tire 22 are a plurality of integrated pressure sensor devices 28. The integrated pressure sensor devices 28 move freely about the inflatable portion 26 of the tire 22. Considering the direction of travel of the vehicle 12 (indicated by the arrow in FIG. 1 as being to the right), under vehicle acceleration the integrated pressure sensor devices 28 may preferentially accumulate at the lower and left side of the inflatable portion 26 of the tire 22, as shown in FIG. 1. Depending on the speed of travel, the integrated pressure sensor devices 28 can travel up the rear of the inflatable portion 26 of the tire 22, due to motion of the tire 22. At some point in time, having reached a vertical portion of an inside wall of the body portion 24, the integrated pressure sensor devices 28 fall from the wall toward the bottom of the tire 22. At higher vehicle speeds, the sensor devices 28 may bounce randomly around inside the inflatable portion 26, deflecting off all portions of the inside wall of the tire 22 due to rapid motion of the wheel 16.

Each integrated pressure sensor device 28 is equipped with a transducer that on collision of the sensor device 28 with the wall of the tire 22 converts mechanical acceleration experienced by the sensor device 28 into electrical energy, as will be discussed later. The electrical energy is used to power a pressure sensor integral with the sensor device 28 that measures the air pressure within the inflatable portion 26 of the tire 22. Once sufficient electrical energy is stored, each integrated pressure sensor device 28 also transmits a wireless signal from the device 28 through the body of the tire 22. The wireless signal carries data corresponding to the measured air pressure. A wireless receiver 30 mounted to the chassis 14 of the vehicle 12 is positioned within range of the transmitted signal. The wireless receiver 30 receives a signal encoded with a value corresponding to the air pressure measurement. The value is forwarded to other vehicle systems or to a user interface.

Figure 2:
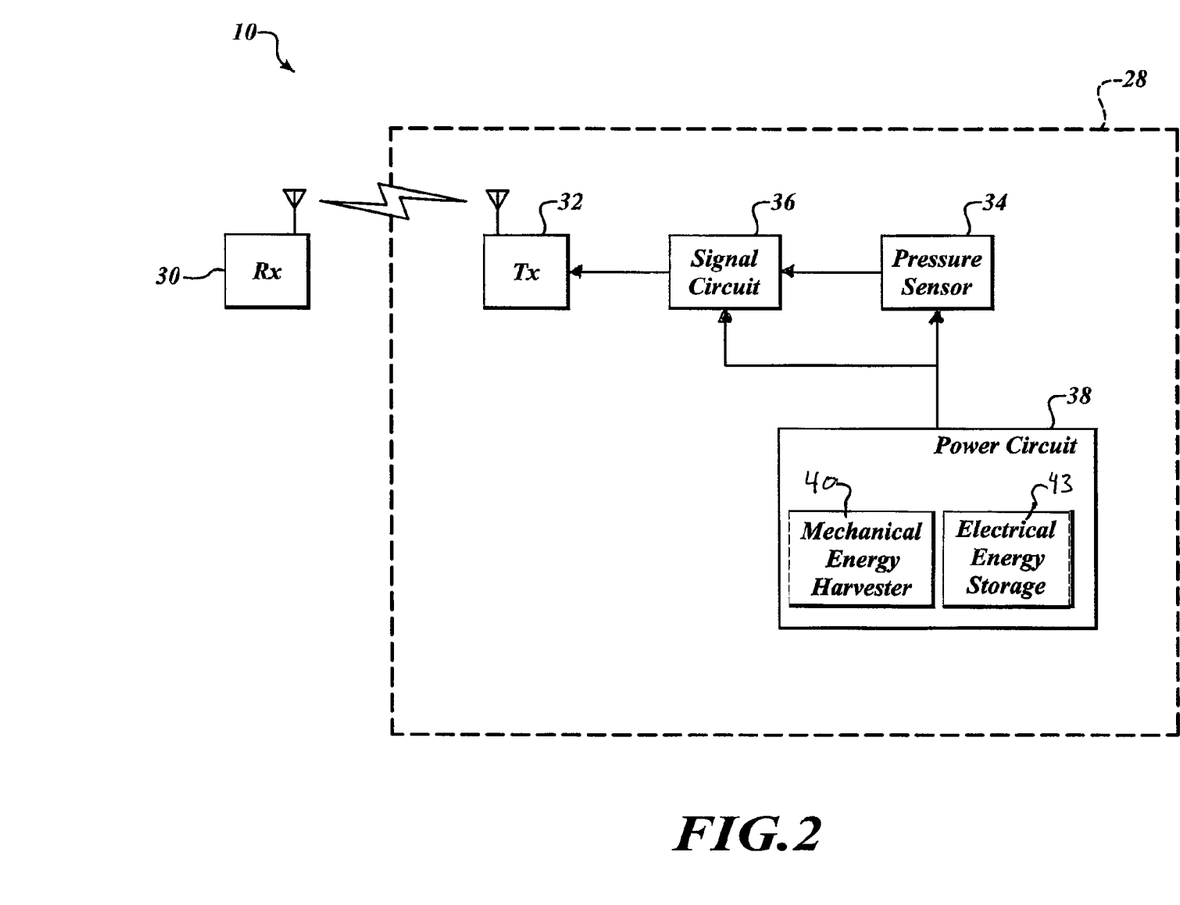
FIG. 2 illustrates a block diagram of an embodiment of the self-powered tire pressure sensor system.

FIG. 2 shows a block diagram of the self-powered tire pressure sensor system 10, including one of the plurality of integrated pressure sensor devices 28 and the wireless receiver 30. Each integrated pressure sensor device 28 includes a wireless transmission circuit 32, an air pressure sensor 34, a signal circuit 36, and a power circuit 38. The power circuit 38 includes a mechanical energy harvester 40 and an electrical energy storage element 43. The transmitter 32 is in wireless communication with the receiver 30. The pressure sensor 34 is in signal communication with the wireless transmission circuit 32 through the signal circuit 36. The power circuit 38 is coupled to the pressure sensor 34 and the signal circuit 36 for the purpose of powering each.

Figure 3:
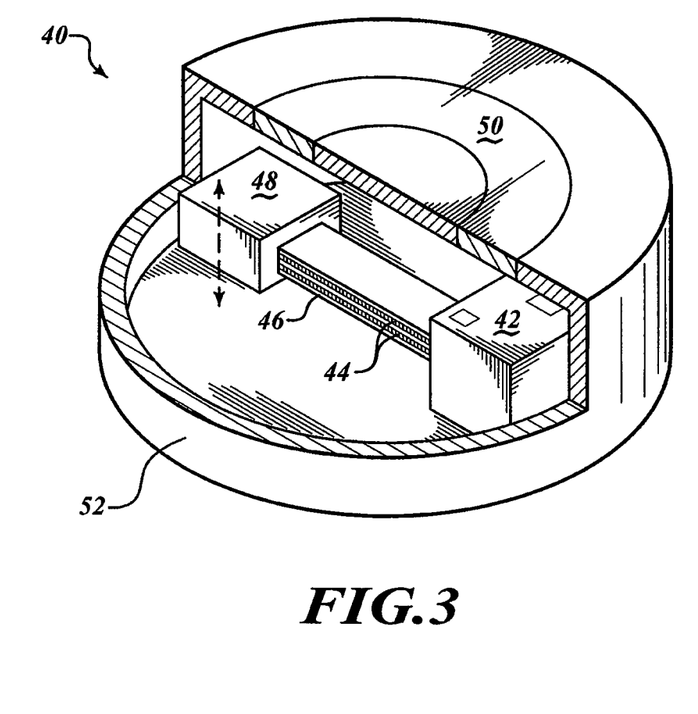
FIG. 3 illustrates a perspective view of a mechanical energy harvester portion of a power circuit of the self-powered tire pressure sensor system.

FIG. 3 shows one example of a mechanical energy harvester 40, as is well known in the art. The mechanical energy harvester 40 includes a mount 42, piezoelectric layers 44, conductor layers 46, a pendulum mass 48, electrical contacts 50, and a housing 52. The piezoelectric layers 44 are piezoelectrically active and emit a small amount of electrical charge under an applied stress. The piezoelectric layers 44 are sandwiched between the conductor layers 46. In one embodiment, the piezoelectric and conductor layers 44, 46 are a bar-like shape with the pendulum mass 48 at one end of the bar and held fixed in a mount 42 at the other. The mount 42 is fixed to the housing 52. The pendulum mass 48 is free to move along an axis perpendicular to the piezoelectric and conductor layers 44, 46. An electrical connection is made between the conductor layers 46 and the electrical contacts 50 on the housing 52 via the mount 42.

When the housing 52 experiences a mechanical acceleration due to an applied force, the mechanical acceleration is translated through the piezoelectric and conductor layers 44, 46 to the pendulum mass 48. Movement of the pendulum mass 48 induces flexure in the piezoelectric and conductor layers 44, 46, imposing a stress on the piezoelectric layers 44 that connect the mount 42 to the pendulum mass 48. The resulting stress in the piezoelectric layers 44 leads to a voltage developing across the conductor layers 46, which becomes applied across the electrical contacts 50 via the electrical connection through the mount 42. A small capacitor or other electrical energy storage element 43 is coupled to the harvester 40 to store the developed potential and maintain a desired voltage for the signal circuit. The capacitor can be part of the signal circuit 36, mounted inside the housing 52, or coupled to either the harvester 40 or the signal circuit 36. The potential at the contacts 50 is output from the power circuit 38 of FIG. 2 and is available to be applied to the air pressure sensor 34 and the signal processing circuit 36, as shown in FIG. 2.

Figure 4:
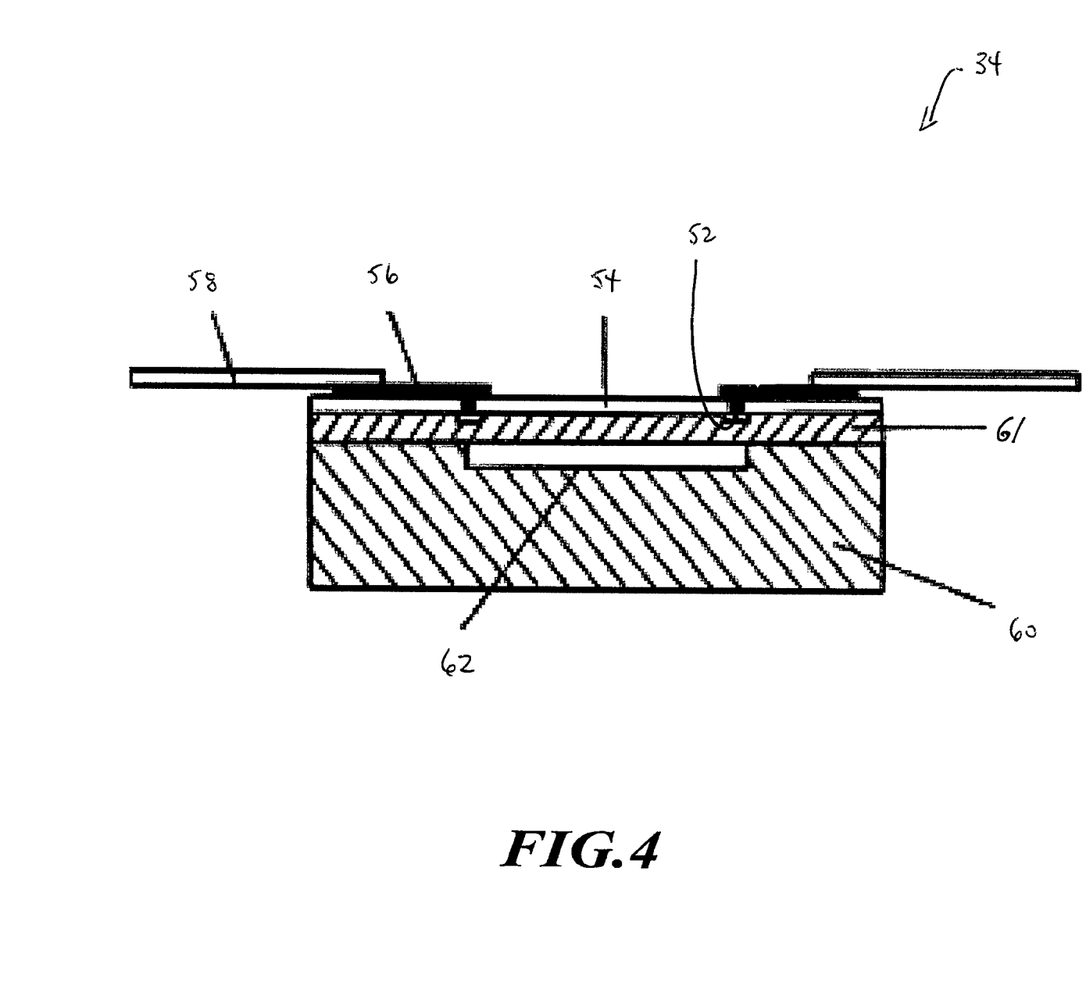
FIG. 4 illustrates a cross-sectional view of the air pressure sensor of the self-powered tire pressure sensor system.

FIG. 4 shows an embodiment of the air pressure sensor 34. The air pressure sensor 34 of this embodiment functions based on the piezoresistive effect, but in alternative embodiments the air pressure sensor 34 functions based on alternative techniques, such as membrane sensors, stress sensors, or the like.

In one embodiment the air pressure sensor 34 includes piezoresistive elements 52, an isolator layer 54, a metallization layer 56, sense conductors 58, a substrate 60, a diaphragm layer 61, and a reference pressure cavity 62. The substrate 60 supports the diaphragm layer 61. The reference pressure cavity 62 lies between the substrate 60 and the diaphragm layer 61. The piezoresistive elements 52 are electrically connected with one another in a Wheatstone bridge configuration on the top surface of the diaphragm layer 61. The piezoresistive elements 52 and the diaphragm layer 61 are covered by the isolator layer 54. The metallization layer 56 covers portions of the isolator layer 54 supported by the substrate 60. At selected points on the isolator layer 54 the metallization layer 56 passes through the isolator layer 54 to connect to the piezoresistive elements 52. The sense conductors 58 connect to the metallization layer 56.

In operation, pressure acts on the diaphragm layer 61, deflecting the diaphragm layer toward the substrate 60 and into the reference pressure cavity 62. Deflection of the diaphragm layer 61 also causes deflection of the piezoresistive elements 52 leading the electrical resistance of each element to vary. The variation in resistance of the piezoelectric elements 52 causes the voltage measured across the Wheatstone bridge configuration of the elements 52 to change, which is sensed across the sense conductors 58. A correlation can be made between the pressure acting on the diaphragm layer 61 and the voltage measured across the sense conductors 58. This type of pressure sensor can be calibrated at the time of manufacture and has been shown to be very accurate. It is also robust and reliable in operation in harsh conditions and over long periods of time. Of course, other known pressure sensors may also be used, and this is just one example of an acceptable sensor.

Figure 5:
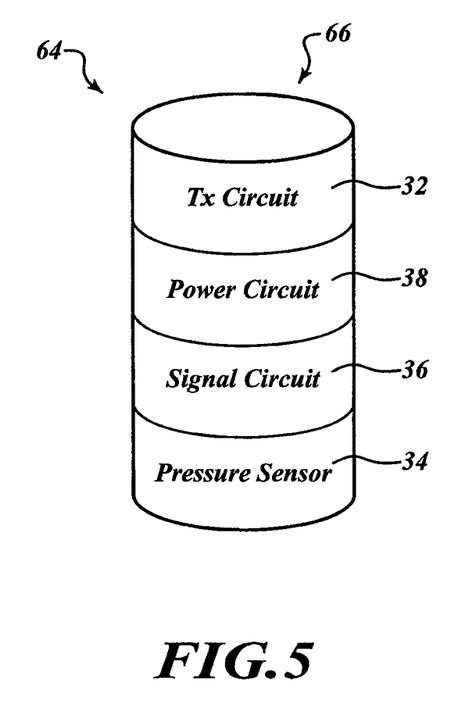
FIG. 5 illustrates a perspective view of a packaged self-powered tire pressure sensor system.

FIG. 5 shows one embodiment of an electronic package 64 of the integrated pressure sensor device 28 shown in FIG. 2. In this embodiment, the integrated pressure sensor device 28 includes the wireless transmission circuit 32, the air pressure sensor 34, the signal circuit 36, and the power circuit 38 packaged in a single package housing 66. In one embodiment, the air pressure sensor 34 and the power circuit 38 are integrated together in a single micro-electromechanical system (MEMS) based on MEMS fabrication techniques and CMOS circuit processing as are well known in the art. In another embodiment, the wireless transmission circuit 32, the air pressure sensor 34, the signal processing circuit 36 and the power circuit 38 are integrated onto a single semiconductor chip that includes both MEMS-type mechanical devices and semiconductor-based electrical circuits. In another embodiment, the electronic package 64 is deliberately designed to transmit an acceleration experienced by the device 28 to a cantilever portion of the power circuit 38 during a collision of the device 28 with the body portion 24 of the tire 22 in order to maximize the conversion of received mechanical energy into stored electrical energy.

One technique by which the electronic package 64 is installed in a tire is through a valve and valve stem of a tire. The electronic package 64 is a very small package, even as compared to standard integrated circuits. The entire package 64, including the transmission circuits, power circuits, signal circuits, and pressure sensor, are generally on the order of 0.5 millimeters or smaller. In one embodiment, the electronic package 64 is 0.1 millimeters for each of the dimensions of height, width, and depth. The package 64 is therefore of the size that approximately ten or twenty packages 64 could fit on the head of a pin. Pressure sensors, power circuits, and signal circuits of this size are easily and routinely made using techniques currently well known in the art. Indeed, in the prior art, one of the difficulties of coupling to extremely small circuits are the electric wires connecting from the circuits to other components. The present electronic package 64 does not have any external wires for connecting to other circuits, and therefore can be made as small as reasonably practical for the components to be included therein. The wireless transmission circuit 32 may include an antenna which is wrapped around the rest of the electronic package 64 a number of times in order to increase the length of the antenna transmission line to increase the signal strength. Very small radio frequency identification (RFID) chips are well known in the art today which have sufficient antenna length to receive and transmit signals at a distance greater than several feet. Accordingly, standard RFID technology may be used for the construction of the transmission circuit 32 and the antenna therein.

Due to the size of the electronic package 64, one or more packages 64 may be inserted into a tire through the valve stem during conventional tire inflation. The electronic packages 64 may be added while the tire is still mounted to a vehicle.

According to one embodiment of the invention, many dozens, and perhaps hundreds, of the electronic packages 64 are suspended in an air pressure canister such as a conventional aerosol bottle. An example of the conventional aerosol bottle is one that is two inches in diameter and ten inches high, similar to the aerosol bottles used to store and dispense hairspray, tire repair compound, and the like. The electronic packages 64 are added to the pressurized can by conventional techniques in the same way that other materials are added to aerosol cans and pressurized.

To add the electronic packages 64 to the tire, a valve on the aerosol can and a corresponding valve on a valve stem of the tire are coupled. The air in the aerosol can flows into the tire and carries with it the electronic packages 64 stored therein. This is most easily carried out by having the pressure in the can at a significantly higher pressure than a standard tire pressure, for example, by having the can pressurized in the range of 80 psi to 120 psi and using the can to partially inflate a tire that is in the range of 30 psi. Since the can has relatively low volume compared with the tire, the actual pressure of the tire will stay approximately constant while many of the electronic packages 64 are carried by the airflow through the tire valve into the tire mounted on the vehicle. Adding the electronic packages 64 to the vehicle by this technique provides an easy method for applying the invention to a vehicle currently on a highway.

The embodiment above also solves the problem of owners who currently have alternative tire pressure sensors, or have no pressure measurement system at all in their vehicle, and desire to switch to a measurement system in accordance with this invention. According to the embodiment above, the owner of either vehicle type may easily convert his vehicle to one in which tire pressure measurement is automatically provided from all four tires on an internal vehicle gauge by adding the packages 64 to the tires by dispensing them from an aerosol can.

Figure 6:
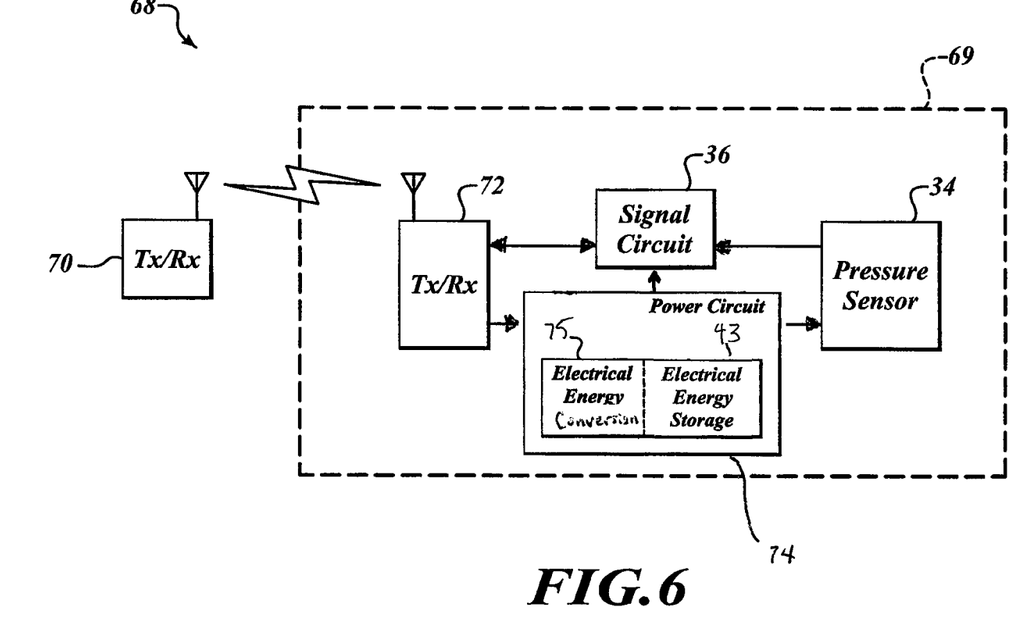
FIG. 6 illustrates a block diagram of an alternative embodiment of the self-powered tire pressure sensor system.

FIG. 6 shows an alternatively powered tire pressure sensor system 68. In this embodiment, the sensor device 69 does not contain a mechanical energy harvester or an electrical storage device. The alternatively powered system includes an alternatively powered sensor device 69 and a base transceiver 70. The alternatively powered sensor device 69 includes a passive remote transceiver 72, the pressure sensor 34, the signal circuit 36, and an alternative power circuit 74. The alternative power circuit 74 includes an electrical energy conversion component 75 and the energy storage component 43, such as a capacitor. The base transceiver 70 and the remote transceiver 72 are in wireless communication with one another, using techniques well known in the art. The power circuit 74 is electrically coupled to the remote transceiver 72 and converts energy in the received signal to usable electrical potential. The power circuit 74 provides power to the pressure sensor 34 and the signal circuit 36. The pressure sensor 34 is coupled to the remote transceiver 72 through the signal circuit 36.

In operation, the base transceiver 70 outputs an electromagnetic field that is received by an antenna included as part of the passive remote transceiver 72. The electromagnetic energy received by the remote transceiver 72 is sufficient to drive the signal circuit 36, the power circuit 74, and the pressure sensor 34. While the circuit is operating, the pressure is sensed and then a signal corresponding to measured pressure is echoed back to the base transceiver 70 via the remote transceiver 72. Systems of this type are well known in the field of passive RFID chips and a system similar to ones used in those circuits may be used herein and will therefore not be described in further detail.

One advantage of the embodiment of FIG. 6 is that the base transceiver 70 may probe each of the tires individually on a timed sequence. In this embodiment, fewer sensor devices 69 are put in each tire, for example in the range of ten or less, in order to provide backup sensor devices 69 and redundancy. When the base transceiver 70 outputs a signal to power the respective sensor devices 69 in each tire, nearly all of the sensor devices 69 in the tire respond, thus providing the base transceiver 70 a large number of data points from which the tire pressure can be accurately determined using appropriate statistical analysis. The base transceiver 70 can probe each of the individual tires on a timed sequence by transmitting to only a particular tire at a time or, alternatively, by transmitting a signal at a frequency received and processed by only one of the four tires. As yet another alternative, the base transceiver 70 can use a time-based technique to individually probe each of the four tires on a desired schedule.

One advantage of the embodiment of FIG. 6 is that the tire pressure can be sensed when the vehicle is stationary. This is the case because the base transceiver 70 may be energized irrespective of whether the vehicle is in motion. Therefore, in this embodiment the pressure sensor 34 senses the tire pressure at all times and the vehicle need not be in motion for the tire pressure to be measured. In one embodiment, the base transceiver 70 is electrically coupled to the vehicle's electrical power system in the same way that a user electrically couples to an after-market radio or other device.

Figure 7:
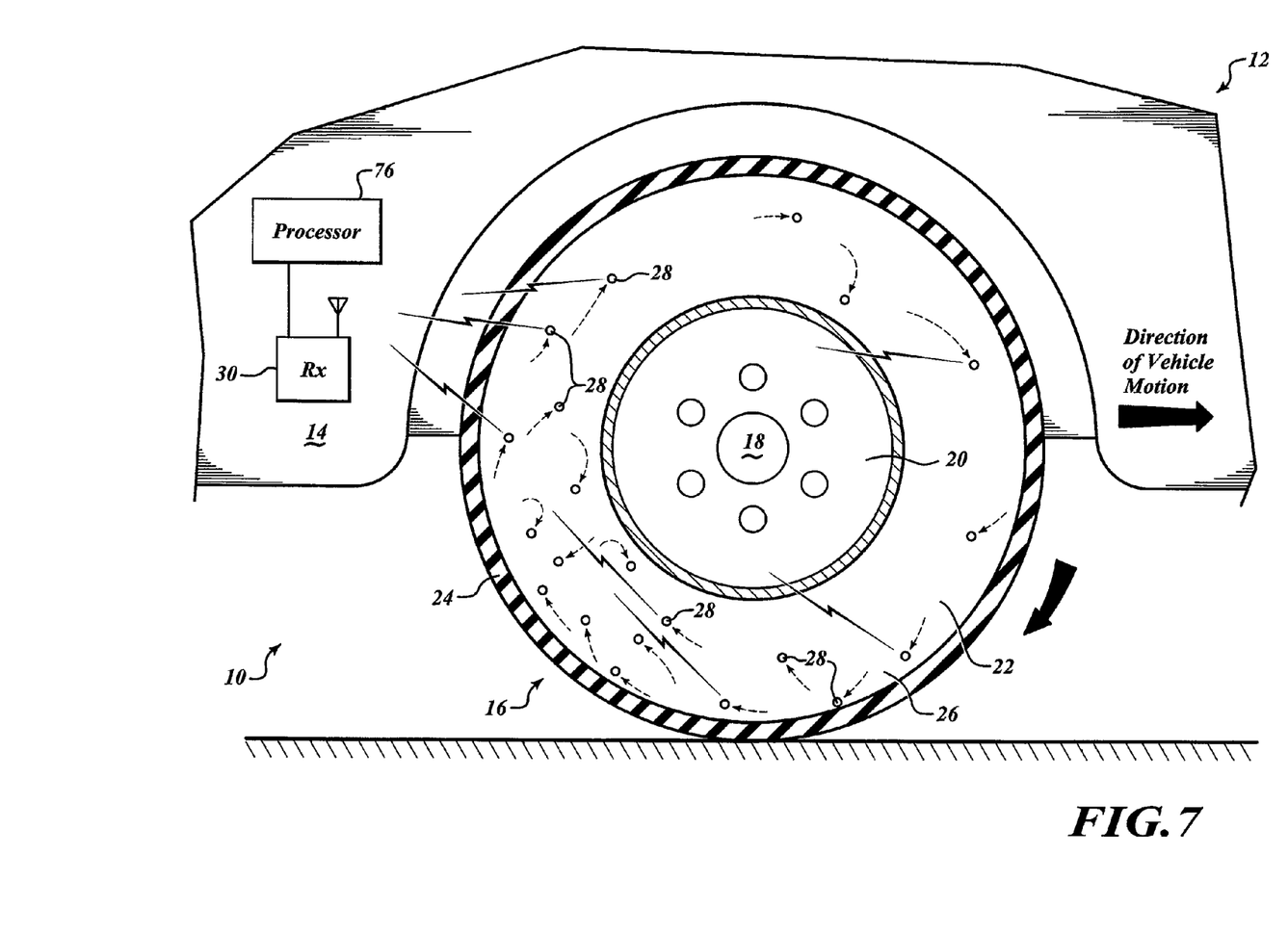
FIG. 7 illustrates a side view, including a partial cut-away view, of an alternative embodiment of the self-powered tire pressure sensor system.

FIG. 7 shows a further embodiment of the self-powered tire pressure sensor system 10 of FIG. 1. In this embodiment, the system 10 includes a processor 76, and the inflatable portion 26 of the tire 22 includes a plurality of integrated pressure sensor devices 28. The processor 76 is in signal communication with the receiver 30. The processor 76 calculates statistical results of pressure sensor values measured by the pressure sensor 34 (FIG. 2) in each of the plurality of integrated pressure sensor devices 28 and received by the receiver 30. The statistical results include a running average and a standard deviation of the tire pressure values measured by each of the plurality of pressure sensor devices 28.

In one embodiment, the processor 76 is coupled to a computer in a vehicle having the pressure sensor system 10. In this embodiment, the vehicle's computer maintains a history of the fuel mileage experienced by the car over various time scales. In one example, the range of mileage scales is one mile, ten miles, 100 miles, 1000 miles and 10,000 miles. In a further embodiment of the pressure sensor system 10, the computer also maintains a history of the tire pressures of the vehicle over the various mileage scales of the vehicle's operation. In yet a further embodiment, the computer correlates the vehicle's fuel mileage at various mileage points in the maintained history with the tire pressures at those mileage points. In an alternative embodiment, these correlations are made based on a time-of-operation basis, rather than a mileage basis.

The following is a description of the operation of the system 10 according to the embodiments of FIGS. 1-7. According to one embodiment of the invention, a plurality of electronic packages 64 are inserted into each of four tires on a vehicle using the previously described technique in order to provide a large number of electronic packages 64 in each tire. In one embodiment, the electronic packages 64 in each tire of the vehicle have a unique identifier in the transmission signal, so that the processor 76 can determine from which tire the transmitted signal originates.

The user then installs in the vehicle, for example in the engine compartment along the firewall or inside the passenger cabin adjacent to the glove compartment, a housing containing the receiver circuit 30 and the processor 76. The receiver 30 is positioned in a location that it can easily receive transmissions from each of the four tires. As previously stated, preferably each of the four tires have an identifier in the received signal so that the processor 76 can easily distinguish the tire from which the measured air pressure originates. The receiver 30 provides this information to the user in an output, either to a visual display or through another computer in the vehicle. The processor 76 may also itself include a display that provides the actual pressure in each of the four tires and an alert that, for example, one of the tire pressures is outside a given desirable range or below a given threshold.

In one embodiment, the operation of the system 10 is as follows. As the car travels down the road, the electronic packages 64 bounce against the interior of the body portion 24 of the tire. Upon each impact with the body portion 24 or the rim 20, electrical potential is generated and delivered to the power circuit 38. After a period of time, sufficient potential is stored that the signal circuit 36 can operate. Using the stored power, the signal circuit 36 generates a signal corresponding to the measured pressure value. The wireless transmission circuit 32 receives sufficient power to transmit the signal through the tire body 24. After sufficient potential has been stored and the pressure properly sensed, a transmission burst from the transmission circuit 32 wirelessly transmits the signal to the receiver 30, which amplifies it and sends it to the processor 76. That particular electronic package 64 then goes silent for a short period of time while continued impacts with the tire body 24 build up sufficient electrical potential to transmit at a later time.

In one embodiment, each tire contains dozens and perhaps hundreds of electronic packages 64. At any given time, only a portion of the electronic packages 64 have sufficient electrical potential to transmit. However, since the tire holds many electronic packages 64, there is a high assurance that at any given time at least one, and preferably a greater number of the packages 64, will transmit to the receiver 30 simultaneously. Accordingly, if there are in the range of 40-60 electronic packages 64 in each tire 16, then each electronic package 64 need transmit only once per minute in order to ensure that the receiver 30 receive a signal at least once per second from the tire 16. Of course, if desired, ten or fewer electronic packages 64 may be inserted into each tire and the transmissions may occur less frequently, for example, only two or three times per minute. In typical vehicle use, this rate would be sufficient to provide a driver with accurate measurement of their vehicle's current tire pressures.

In some instances, a driver may wish to know a vehicle's tire pressures before vehicle startup. In this instance, according to one embodiment, the driver could start the vehicle and back it out of its parking place. The motion from driving would begin to charge at least some of the potential storage devices in each tire. After a short distance, sufficient energy would have been harvested to provide a measurement of the tire pressure while the tire is still cold. Accordingly, a driver, by driving just a short distance, can accurately determine the cold tire pressure. By the time the driver arrives at a service station, enough information will be available that the appropriate amount of air to add or remove may be controlled by using the gauge on the service station air pump. The driver may check the accuracy of the service station air pump gauge using the vehicle-based system 10 as the driver drives the vehicle away from the station.

According to another embodiment, a driver may desire to have the tire pressure sensing electronic packages 64 installed in the tire when new tires are purchased. Due to the relative ease of installation and the expected low cost of such systems, a large number of tire dealers across the entire United States can be expected to have the pressure sensing electronic packages 64 in stock in each of their stores. When a driver buys new tires, the tire dealership can inquire whether the driver wishes to have the pressure sensing electronic packages 64 installed in the car tires when the new tires are first mounted. If the driver wishes to have the pressure sensing electronic packages 64 installed, then the dealer merely adds the small cost of such installation to the cost of each tire, which could be in the range of a few dollars per tire. If the driver is purchasing the entire system 10, the dealer also installs the appropriate receiver and processor systems and connects them to the appropriate power and data systems of the car. When the tire dealer inflates the tires, the dealer inserts the appropriate electronic packages 64 or sensors 69 into each tire as part of the standard inflation process. The dealer is therefore assured of having an adequate number of the sensors 69 in each tire. The tire dealer can then spin the tires as is normally done when tires are mounted, such as during spin balancing, and during the spin balancing can also test the system to ensure that the sensors 69 operate and are properly calibrated to accurately measure the tire pressure. If the sensors 69 are not properly calibrated, the tire dealer, if desired, can calibrate the tire pressure through the processor 76 so that the output accurately reflects the absolute tire pressure in each tire. Any time recalibration is needed, the driver may return to the tire dealer, and with a simple procedure the system 10 can be recalibrated to reflect the exact current tire pressure.

In a further embodiment, the computer receives tire pressure values measured by the integrated pressure sensor devices 28 in real time and outputs an anticipated current fuel mileage value for the miles currently being driven based on one of the correlated fuel mileage and tire pressure values maintained by the computer. In yet another embodiment, the pressure sensor system recommends to an operator changes in tire pressure that the operator can make to increase mileage based on the current measured tire pressures.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for measuring air pressure in an inflatable automobile tire comprising:
an inflatable tire mounted on a wheel and rotatable about a hub of an automobile;
a plurality of air pressure measurement sensors located within an inflatable portion of the mounted tire, each air pressure sensor being within its own individual housing, each individual housing being of a size sufficiently small to fit through a valve stem of the tire when the tire is being inflated with air;
a plurality of electromechanical transducers, having one coupled to each of the respective air pressure measurement sensors by a power circuit and positioned within each respective housing of the air pressure sensor to which the transducer is coupled and configured to generate power to be used by each of the respective air pressure sensors by electrical potential converted from mechanical acceleration experienced by movement of the electromechanical transducer;
a plurality of electric power storage devices within each housing respectively and coupled to the respective electromechanical transducer that is within the same housing as the electric power storage device for storing power produced by the respective electromechanical transducer;
a plurality of wireless transmission circuits, each one being respectively coupled to the respective electric power storage device within the same housing, and to each of the respective air pressure measurement sensors by a signal circuit and positioned within each respective housing of the air pressure sensor to which the respective pressure sensor is coupled and configured to wirelessly transmit an air pressure measurement signal received from the sensor, each respective electromechanical transducer being so small that the electromechanical transducer is incapable of producing sufficient power to operate the pressure sensor and wireless transmission circuit continuously and the wireless transmission circuit draws power from the electric power storage device during the time period of the wireless transmission operation;
a wireless receiver located on a chassis of the automobile and configured to receive a plurality of air pressure measurement signals from the respective wireless transmission circuits; and
an output interface coupled to the wireless receiver and configured to periodically output an air pressure measurement value for the tire.

2. The system of claim 1 wherein the wireless receiver is an integrated common circuit mounted on a chassis of an automobile and further including:
a power supply coupled to the chassis of the automobile and to power source of the automobile to receive electric power from the power source of the automobile.

3. The system of claim 1 wherein the air pressure measurement sensor is a piezoresistive air pressure measurement sensor.

4. The system of claim 1 wherein the air pressure measurement sensor, the electromechanical transducer and the wireless transmission circuit are an integrated device positioned in a common housing for each of the plurality of air pressure sensors.

5. The system of claim 4, further comprising a processor communicatively coupled with the wireless receiver and configured to execute a statistical calculation on the plurality of remotely measured air pressure measurement values.

6. The system of claim 5 wherein the statistical calculation includes calculation of at least one of an average value and a standard deviation value of the plurality of received air pressure measurement values.

7. The system according to claim 1 wherein the electric storage device is a capacitor.

8. A method for remotely sensing air pressure in an inflatable tire comprising:
receiving a plurality of housings into a value stem of the inflatable tire, the value stem having an air inlet port to receive air to inflate the tire with air, the housing having therein a power generation circuit, an electric power storage device, an air pressure sensor and a remote transceiver;

moving each of the plurality of housings and the respective power generation circuits within its respective housing relative to the tire as the tire rotates, the power generation circuit being fully inside of the tire;

converting in a power circuit inside the tire energy from the power generation circuit into electrical energy based on movement of the power generation circuit relative to the tire;

driving the air pressure measurement sensor electrically connected to the power circuit using the converted electrical energy to determine the air pressure inside the tire;

storing electrical energy created by the respective power generation circuits in the respective electric power storage devices located within each the respective housings;

measuring the air pressure inside the tire using the air pressure measurement sensor; and wirelessly transmitting from a first remote transceiver of the plurality of remote transceivers electrically connected to a first respective air pressure measurement sensor in a first housing to a base transceiver outside the tire a signal encoded with a value corresponding to the measured air pressure at first time period after a threshold amount of electricity has been stored in a first electric power storage device of the plurality of electric power storage devices;

wirelessly transmitting from a second remote transceiver of the plurality of remote transceivers electrically connected to a second respective air pressure measurement sensor in a second housing of the plurality of housings to the base transceiver outside the tire a signal encoded with a value corresponding to the measured air pressure at second time period after a threshold amount of electricity has been stored in a second electric power storage device of the plurality of electric power storage devices.

9. The method of claim 8 further comprising storing the converted electrical energy in an electrical energy storage element.

10. The method of claim 9 further comprising accumulating the converted electrical energy over a duration of time.

11. The method of claim 8 further comprising outputting the measured air pressure value to a communicatively coupled output interface.

12. The method according to claim 8 further including:
wirelessly transmitting a plurality of signals from a plurality of additional remote transceivers coupled to a corresponding plurality of air pressure sensors located inside the tire to the base transceiver, each of the signals having an encoded value that corresponds to a measured air pressure for an air pressure measurement sensor to which the respective remote transceiver is coupled.

13. The method according to claim 12 wherein fewer than all the pressure sensors located inside the tire transmit an air pressure signal at the same time.

14. The method according to claim 8 wherein the electric storage device is a capacitor.

* * * * *